(12) United States Patent
Bhatkhande et al.

(10) Patent No.: US 8,006,240 B2
(45) Date of Patent: Aug. 23, 2011

(54) SUPPORT CONTINUOUS AVAILABILITY BY ALLOWING THE USE OF MULTIPLE CONCURRENT VERSIONS OF SHARED ARTIFACT LIBRARIES, WITH PROPER BIND-DRAIN SEMANTICS, FOR LONG-LIVED PROCESS APPLICATION CONSUMERS

(75) Inventors: Mandar Ganesh Bhatkhande, Milpitas, CA (US); Christopher Shane Claussen, Austin, TX (US); Pranta Das, Fremont, CA (US); Stefan Georg Derdak, San Jose, CA (US); Paul Fredric Griepentrog, San Francisco, CA (US); Edwin V. Sapugay, San Mateo, CA (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1645 days.

(21) Appl. No.: 11/292,190

(22) Filed: Dec. 1, 2005

(65) Prior Publication Data

US 2007/0169103 A1  Jul. 19, 2007

(51) Int. Cl.
G06F 9/44 (2006.01)
(52) U.S. Cl. ............................................. 717/169
(58) Field of Classification Search ........... 717/168–178
See application file for complete search history.

(56) References Cited

U.S. PATENT DOCUMENTS

| | | | |
|---|---|---|---|
| 5,974,428 A | 10/1999 | Gerard et al. | 707/203 |
| 6,185,734 B1* | 2/2001 | Saboff et al. | 717/164 |
| 6,272,674 B1* | 8/2001 | Holiday, Jr. | 717/174 |
| 6,560,614 B1 | 5/2003 | Barboy et al. | 707/201 |
| 6,754,717 B1 | 6/2004 | Day, III et al. | 709/248 |
| 6,871,344 B2 | 3/2005 | Grier et al. | 717/162 |
| 6,892,320 B1 | 5/2005 | Roush | 714/15 |
| 6,999,976 B2* | 2/2006 | Abdallah et al. | 707/200 |
| 7,392,324 B2* | 6/2008 | Cardone et al. | 709/238 |
| 7,478,385 B2* | 1/2009 | Sierer et al. | 717/174 |
| 7,614,040 B2* | 11/2009 | Wagner et al. | 717/120 |
| 2002/0078262 A1 | 6/2002 | Harrison et al. | 709/331 |
| 2004/0003390 A1* | 1/2004 | Canter et al. | 717/178 |

OTHER PUBLICATIONS

Basham et al., "Head First Servlets and JSP", Aug. 2004, O'Reilly Media, Inc., p. 225, 229-230.*
U.S. Appl. No. 10/849,294, filed May 19, 2004, Plante.

* cited by examiner

Primary Examiner — Anna Deng
(74) Attorney, Agent, or Firm — Yee & Associates, P.C.; Prentiss W. Johnson (57) ABSTRACT

A computer implemented method, apparatus, and computer usable program code for updating multiple concurrent versions of shared artifact libraries. Shared artifact libraries are associated with a consuming application for establishing shared artifact libraries upon which the consuming application has a dependency for artifacts. A snapshot of the shared artifact libraries associated with the consuming application in an active session is created in response to starting a session. The shared artifact libraries are updated in response to new versions and updates of the shared artifact libraries becoming available. Artifacts are dispensed from the shared artifact libraries to the consuming application based on the snapshot of the session.

28 Claims, 8 Drawing Sheets

SUPPORT CONTINUOUS AVAILABILITY BY ALLOWING THE USE OF MULTIPLE CONCURRENT VERSIONS OF SHARED ARTIFACT LIBRARIES, WITH PROPER BIND-DRAIN SEMANTICS, FOR LONG-LIVED PROCESS APPLICATION CONSUMERS

BACKGROUND OF THE INVENTION

1. Field of the Invention

The present invention relates generally to data processing, and more particularly to a computer implemented method, system, and computer usable program code for providing multiple concurrent versions of shared artifact libraries in a continuously available environment.

2. Description of the Related Art

Reliance on software has grown exponentially in recent years because of the increasing use of computing devices in every aspect of business and society. Users have come to rely on software applications and need software with all of the associated libraries, databases, and linked programs and files to be properly maintained and updated.

Updating systems in the on-demand computing era is increasingly difficult because businesses and individuals want changes and updates made with minimum or zero downtime and without compromising data integrity. Scheduling and performing updates is both costly and time consuming. Composite applications upgrades may cost money in terms of personnel and in terms of lost profits. For example, business integration servers and composite applications are at the hub of an enterprise's back-end information systems and need to have the minimum downtimes possible for effective information flow. Servers and composite applications store large quantities of information in the form of libraries and databases.

Performing library updates is especially complicated because of the interactions of multiple composite applications. A composite application as defined herein is an application created by loosely coupling several different services and data stores via standardized message layers. The component parts of some composite applications may be mixed and matched allowing developers to create a wide variety of applications with a relatively small set of services. Updating composite applications is difficult because the applications may consume artifacts that reside in shared artifact libraries, since any update to a library, although desired by one composite application, may adversely affect another application.

Updates are further complicated because some composite applications may have long-lived business process sessions that cannot be updated until the process session has fully and finally ended. As a result, scheduled or unscheduled downtime for updates become necessary and consuming business applications may not be continuously available.

SUMMARY OF THE INVENTION

The aspects of the present invention provide a computer implemented method, apparatus, and computer usable program code for updating multiple concurrent versions of shared artifact libraries. Shared artifact libraries are associated with a consuming application for establishing shared artifact libraries upon which the consuming application has a dependency for artifacts. A snapshot of the shared artifact libraries associated with the consuming application in an active session is created in response to starting a session. The shared artifact libraries are updated in response to new versions and updates of the shared artifact libraries becoming available. Artifacts are dispensed from the shared artifact libraries to the consuming application based on the snapshot of the session.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
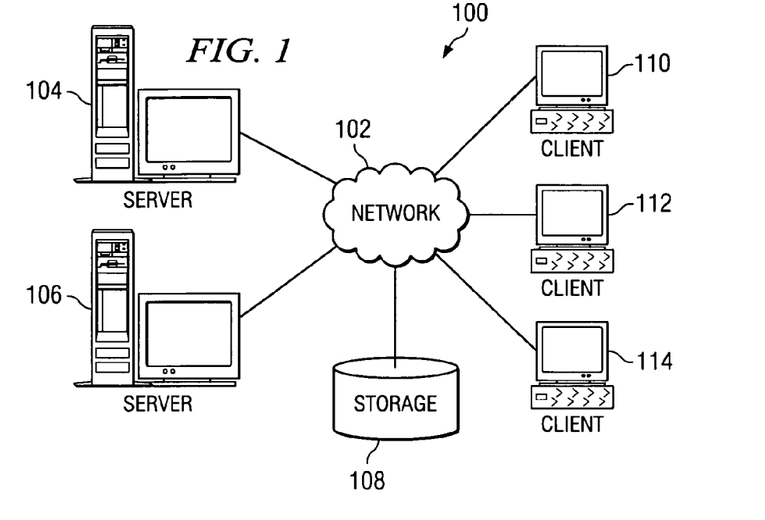
FIG. 1 is a pictorial representation of a network of data processing systems in which aspects of the present invention may be implemented.
Figure 2:
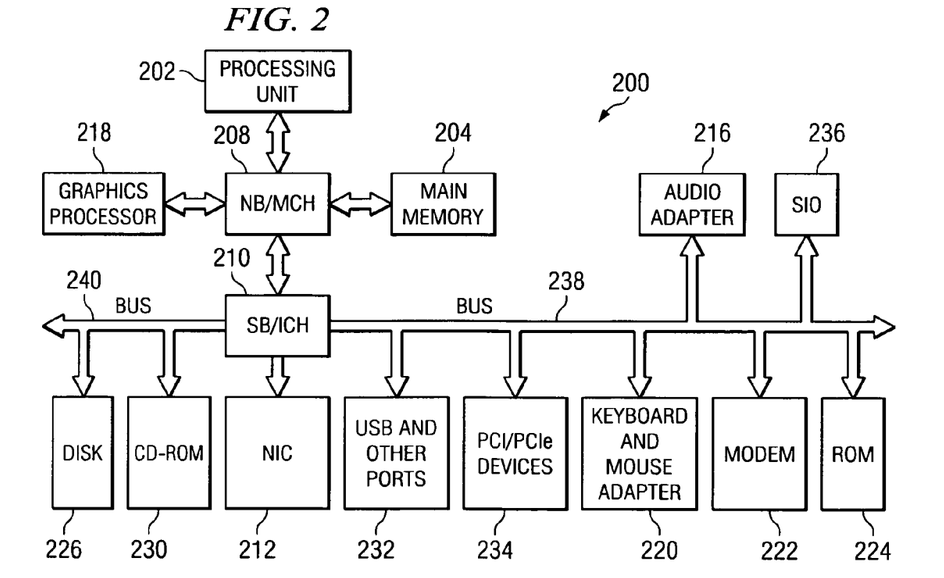
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented.

Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM WebSphere process server, IBM eServer™ pSeries® computer system, running the Advanced Interactive Executive (AIX®) operating system or LINUX operating system (WebSphere, eServer, pSeries, AIX and associated derivatives are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments of the present invention provide a computer implemented method, apparatus, and computer usable program code for providing multiple concurrent versions of shared artifact libraries in a continuously available environment. A shared artifact library is a library that is shared between multiple consuming applications. For example a shared artifact library could be a list of products, the product version, and the associated price. A single shared artifact library may be used by any number of applications simultaneously and needs to contain correct information in the form of artifacts.

Each composite or consuming application is associated with a set of shared artifact library (SAL) version range manifests that specify the specific prerequisite version ranges that the applicable application or library will accept. An computer application is referred to as a consuming application because the application relies on artifacts within the library to perform specific tasks. For example, a consuming application may be accessed to show artifacts including available products, prices, and shipping costs. These artifacts are "consumed" from the shared artifact library as they are accessed by the consuming application.

During runtime at the start of a session, a snapshot of all available shared artifact libraries that compute as acceptable are persisted for as long as the session is active. A session is a unique access by a consuming application and/or user. For example, a user may use a consuming application to access text book prices while shopping for text books. The session is created or begins as the individual user begins to rely on information within the shared artifact libraries. For example, the user may select a number of books to purchase relying on the price and shipping costs cited by the consuming application based on the shared artifact libraries accessed.

In these illustrative examples, the snapshot is a link to or copy of the information including artifacts or shared artifact libraries a user is relying on as the session is created. Acceptable shared artifact libraries are those libraries that fall within the set of specific prerequisites associated with the version range manifest. A session is deemed active until the session information relied upon by the application is no longer needed because the session has ended. A session may be long-lived meaning that the session may last days, weeks, months, or longer. An artifact within a shared artifact library is a specific piece of information. That information may be information such as data, bits, or other representation of some aspect of an existing or to-be-built element, such as an object, a definition, a word, a system, a component, or a view. An artifact may not only describe what the artifact is and generates, but the artifact also tells other applications how the artifact gets generated and where to find that generated file.

During an active session only artifacts from the session-bound version set or snapshot of the shared artifact libraries are dispensed to the consuming application. As a result, newer versions of the same libraries may be non-intrusively added to the runtime for other consuming applications. A newer version is a version that has new, updated or revised version. A library version is deemed obsolete when the no active sessions rely on the given library version, a more recent version of the shared artifact library has been added to the runtime in the interim, and the updated shared artifact library becomes acceptable to all consumer applications. Once the library version is deemed obsolete, that library version is to be drained or deleted from the system to make room for update libraries and snapshots linked with other sessions that are still active. Illustrative embodiments of the present invention provide different deployment scenarios that differ slightly for stand-alone deployment, shallow deployment, and deep deployment.

In one illustrative example of the present invention, a purchase is made online by a consumer. The artifact libraries used by the consuming enterprise business application used to execute the transaction may include information regarding the product, price, applicable tax rate, present shipping cost, and so forth. Even though a user initiates the transaction on January $1^{st}$, the product purchased may not be shipped until February $1^{st}$ because of product availability. Within that time period, exemplary artifacts such as the tax rate and shipping cost charged by the business may have changed. There may even be a new version of the purchased product that is now available. These artifacts have likely been updated in the applicable set of shared artifact libraries since January $1^{st}$. However, the January $1^{st}$ transaction needs to be fulfilled according to the quoted tax rate, shipping cost, and specified product version as of January $1^{st}$ as a matter of contract law and good business principles.

Illustrative embodiments of the present invention provide a method wherein on January $1^{st}$ a snapshot of all dependent artifacts and libraries is stored so that the transaction can be completed according to the original terms of the contract. Whenever the January $1^{st}$ transaction is referred to by the consuming business application, the snapshot of dependent artifact libraries taken on January $1^{st}$ is accessed even if updates have been made to the original shared artifact libraries between January $1^{st}$ and February $1^{st}$.

Figure 3:
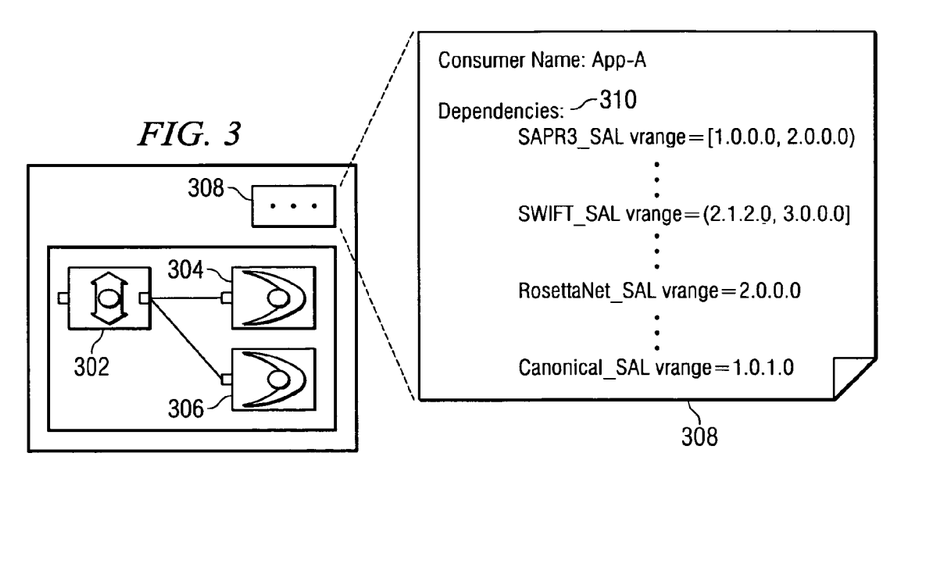
FIG. 3 is a block diagram of a composite application and consumer dependency manifest in accordance with an illustrative embodiment of the present invention.

FIG. 3 is a block diagram of a composite application and consumer dependency manifest depicted in accordance with an illustrative embodiment of the present invention. In one example, a consumer dependency manifest may list a consuming application, dependencies of the consuming application, and acceptable library version ranges that the consuming application may consume without errors or other problems. For example, a consuming application App-A may depend on four different shared artifact libraries each of which may also have a version range that is acceptable to App-A.

Composite application 302 is a consuming application running on a computing device and is dependent on shared artifact libraries 304 and 306. Composite application 302 may be, for example, a business enterprise program accessible stored in a memory such as main memory 204 of FIG. 2 in a device such as server 104 of FIG. 1. Composite application 302 may be accessed by a user using a computing device such as client 114 of FIG. 1.

Composite application 302 declares the dependencies on shared artifact libraries 304 and 306 by making an entry in consumer dependency manifest 308. Consumer dependency manifest 308 directly refers to shared artifact libraries 304 and 306 upon which composite application 302 is dependent. Consumer dependency manifest 308 may also reference other shared artifact libraries upon which shared artifact libraries 304 and 306 are dependent. Consumer dependency manifest 308 indicates dependencies 310 which may include the acceptable version ranges of shared artifact libraries 304 and 306 that composite application 302 can consume without compatibility problems or errors.

The version ranges may be specified in any number of ways including bundle style and library version information based on the standard promulgated by the open service gateway initiative (OSGI) including the R4 bundle style. The open service gateway initiative default standard is the version string 0.0.0 Acceptable version ranges may be inclusive or exclusive and may use logic based labeling including features such as less than, greater than, equal to, and at least. The version range may also specify minimum and maximum range values in terms of an acceptable version floor and ceiling. Consumer dependency manifest 308 may be stored in the application archive of composite application 302.

Artifacts and libraries are frequently updated in order to adjust to new conditions. For example, a business shipping costs may increase because of fuel costs and the tax rate may change. As a result, libraries and artifacts need to be updated and new versions need to be made available to consuming applications. New shared artifact libraries become available as they are linked to consuming applications as permitted by consumer dependency manifest 308. Many times new shared artifact libraries become available when they are published to the server from which the libraries are shared.

Figure 4:
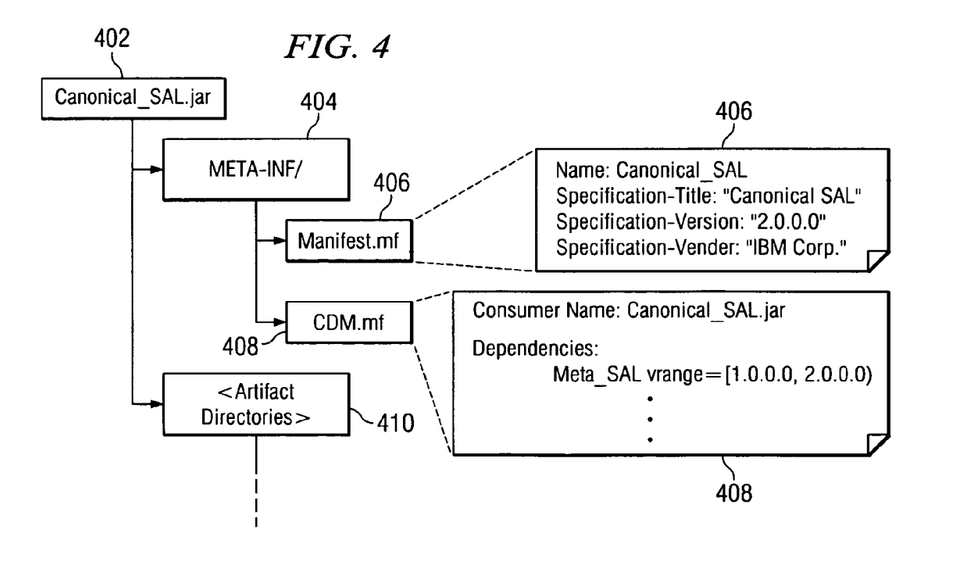
FIG. 4 is block diagram of the structure of a shared artifact library in accordance with an illustrative embodiment of the present invention.

FIG. 4 is block diagram of the structure of a shared artifact library depicted in accordance with an illustrative embodiment of the present invention. Canonical_SAL.jar 402 is an exemplary shared artifact library. Shared artifact libraries are typically .jar or Jar files. In computing, a Jar file, which is short for Java ARchive, is a ZIP file used to distribute a set of Java classes. A ZIP file is a file that is compressed into an archive so that the compressed file occupies less disk space. The Jar file is used to store compiled Java classes and associated metadata that can constitute a composite program. Although the shared artifact library is represented as a first class runtime library entity, the library may be stored differently than in a Jar form in the runtime. For example, the shared artifact library file may be mapped to rows in a relational shared artifact schema repository.

A jar file has a manifest file located in the path META-INF 404. Manifest.mf 406 may be used to store the name and version of the shared artifact library, such as Canonical_SAL.jar 402. The entries in META-INF 404 determine how the jar file is used and index the contents. A shared artifact library may also declare dependencies on other shared artifact libraries in another consumer dependent manifest file in META-INF 404. Canonical_SAL.jar 402 declares dependencies on other shared artifact libraries in CDM.mf 408. Artifact directories 410 include the relevant artifacts of the shared artifact library.

Figure 5:
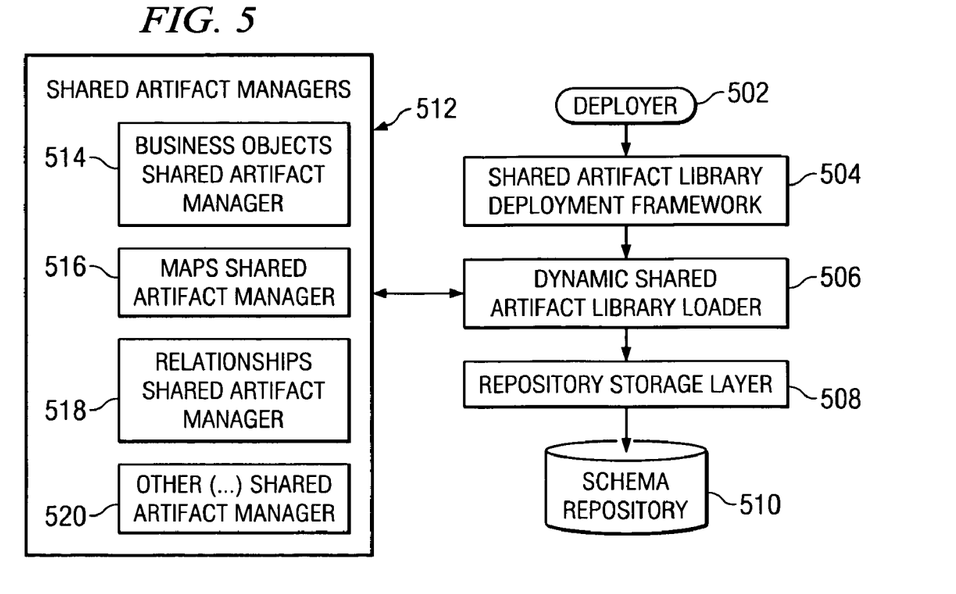
FIG. 5 is a block diagram of a shared artifact library deployment framework in accordance with an illustrative embodiment of the present invention.

FIG. 5 is a block diagram of a shared artifact library deployment framework depicted in accordance with an illustrative embodiment of the present invention. Deployer 502 is the user, server, or other computing device that deploys shared artifact library deployment framework 504. Shared artifact library deployment framework 504 may be deployed using an MBean. In the Java programming language, an MBean or managed bean is a Java object that represents a manageable resource, such as an application, a service, a component, or a device.

Dynamic shared artifact library loader 506 functions in conjunction with shared artifact library deployment framework 504. Dynamic shared artifact library loader 506 includes the versioned repository tree and dependency graphs. The versioned repository tree shows that session bound version sets are dependent on specific versions of shared artifact libraries. The dependency graphs show the shared artifact libraries dependencies with respect to the consuming application.

Repository storage layer 508 is linked to dynamic shared artifact library loader 506, repository storage layer 508 may interface with dynamic shared artifact library loader 506 using interface code 509. Interface code 509 controls when objects within shared artifact manager 512 are loaded and saved to repository storage layer 508. Repository storage layer 508 functions to store snapshots or session bound version sets and shared artifact libraries in schema repository 510. Schema repository 510 may be a hard disk, RAM, flash memory, tape drive, or any other electronic storage medium.

Parameters within repository storage layer 508 may be in extensible markup language (XML) streams or extensible markup language schema definitions (XSD) streams. Additionally, the parameters may be within memory. Extensible markup language is a standard for creating markup languages which describe the structure of data. Extensible markup language is a meta-language or a language for describing languages that allows information and services to be encoded with meaningful structure and semantics that computers and humans can understand. XML is great for information exchange and can easily be extended to include user-specified and industry-specified tags.

An extensible markup language schema definition is an instance of an extensible markup language schema written in the extensible markup language schema language. An extensible markup language schema definition defines a type of extensible markup language document in terms of constraints upon what elements and attributes may appear, their relationship to each other, what types of data may be in them, and other things.

Shared artifact managers 512 are linked to dynamic shared artifact library loader 506. Shared artifact managers 512 include any number of different manager types that classify and organize shared artifacts. Shared artifact managers 512 may include business objects shared artifact manager 514, maps shared artifact manager 516, relationships shared artifact manager 518, and other shared artifact manager 520. Other shared artifact manager 520 may include any other necessary or relevant shared artifact managers. Shared artifact managers 512 contain shared artifacts authored within the dynamic shared artifact library loader 506. Each shared artifact manager may contain multiple heterogeneous shared artifacts and may be deployed as independent library Jar files.

Figure 6:
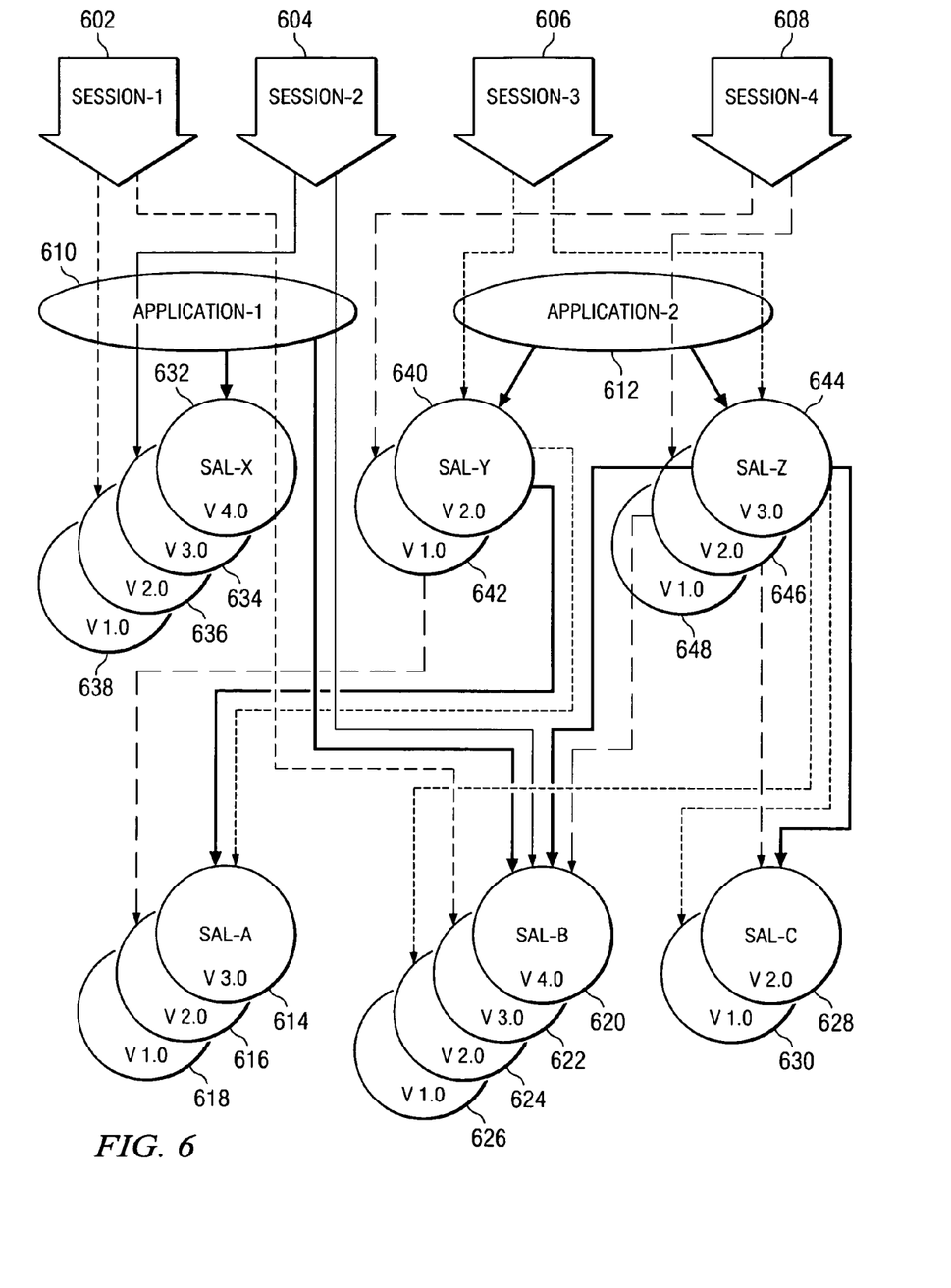
FIG. 6 is a diagram that graphically displays versioned repository trees and dependency graphs in accordance with an illustrative embodiment of the present invention.

FIG. 6 is a diagram that graphically displays versioned repository trees and dependency graphs in accordance with an illustrative embodiment of the present invention. In FIG. 6 straight arrows represent a dependency, such as the dependency of a program application or shared artifact library on a specific version of a shared artifact library. Each set of arrows represents a session bound version set. Lines originating from the session bound version sets represent shared artifact libraries dependencies. Four exemplary session bound version sets or snapshots are shown, session 1 602, session 2 604, session 3 606, and session 4 608.

Two exemplary applications are shown, application 1 610 and application 2 612. Multiple exemplary shared artifact libraries (SAL) are shown, each of which has varying numbers of applicable versions. The shared artifact libraries include SAL A version 3.0 614, SAL A version 2.0 616, SAL A version 1.0 618, SAL B version 4.0 620, SAL B version 3.0 622, SAL B version 2.0 624, SAL B version 1.0 626, SAL C version 2.0 628, SAL C version 1.0 630, SAL X version 4.0 632, SAL X version 3.0 634, SAL X version 2.0 636, SAL X version 1.0 638, SAL Y version 2.0 640, SAL Y version 1.0 642, SAL Z version 3.0 644, SAL Z version 2.0 646, and SAL Z version 1.0 648.

A session bound version set is created or initiated when an application session first relies on artifacts within a set of shared artifact libraries wherein the set is one or more shared artifact libraries. Until the application session is terminated, the session bound version sets are maintained to ensure correct data is accessible. For example, each shared artifact library may include an updated price list, but each session relies on the prices within the shared artifact library version used when the session was created or initiated.

The session bound version sets and applications dependencies on a set of shared artifact libraries illustrates information gleaned from the use of a versioned repository trees, dependency graphs, and consumer dependency manifests, such as consumer dependency manifest 308 of FIG. 3. Most applications are likely to be dependent on the most recent versions of shared artifact libraries available in order to ensure that updated artifacts are used in the applications. For example, application 1 610 has multiple dependencies on SAL X version 4.0 632 and SAL B version 4.0 620. Application 2 612 has multiple dependencies on SAL Y version 2.0 640 which is in turn dependent on SAL A version 3.0 614 and SAL Z version 3.0 644 which also is dependent on SAL B version 4.0 620 and SAL C version 2.0 628. The exemplary applications are dependent on the most recent SAL versions ensuring updated information is accessed by the applications.

Each session bound version set may have different dependencies as well, varying based on when the session was initiated and the most updated version of dependent shared artifact libraries. For example, session 1 602 originated from application 1 610 and may be dependent on SAL X version 2.0 636 and SAL B version 3.0 622. At the time session 1 602 was initiated, SAL X version 2.0 636 and SAL B version 3.0 622 were most likely the most recent SAL's referenced by application 1 610. Session 2 604 also originated from application 1 610 and has dependencies on SAL X version 3.0 634 and SAL B version 4.0 620.

Session 3 606 originated from application 2 612 and may have dependencies upon SAL Y version 2.0 640 which is dependent on SAL A version 3.0 614 and SAL Z version 3.0 644 which is dependent on SAL B version 2.0 624 and SAL C version 1.0 630. Session 4 608 originated from application 2 612 and may have dependencies on SAL Y version 1.0 642 which is dependent on SAL A version 2.0 616 and SAL Z version 2.0 646 which is dependent on SAL B version 4.0 620 and SAL C version 2.0 628.

By maintaining a session bound version set, the correct artifacts from shared artifact libraries may be used by an active session originating from a program application despite the passage of time and versioned updates to the shared artifact libraries.

Figure 7:
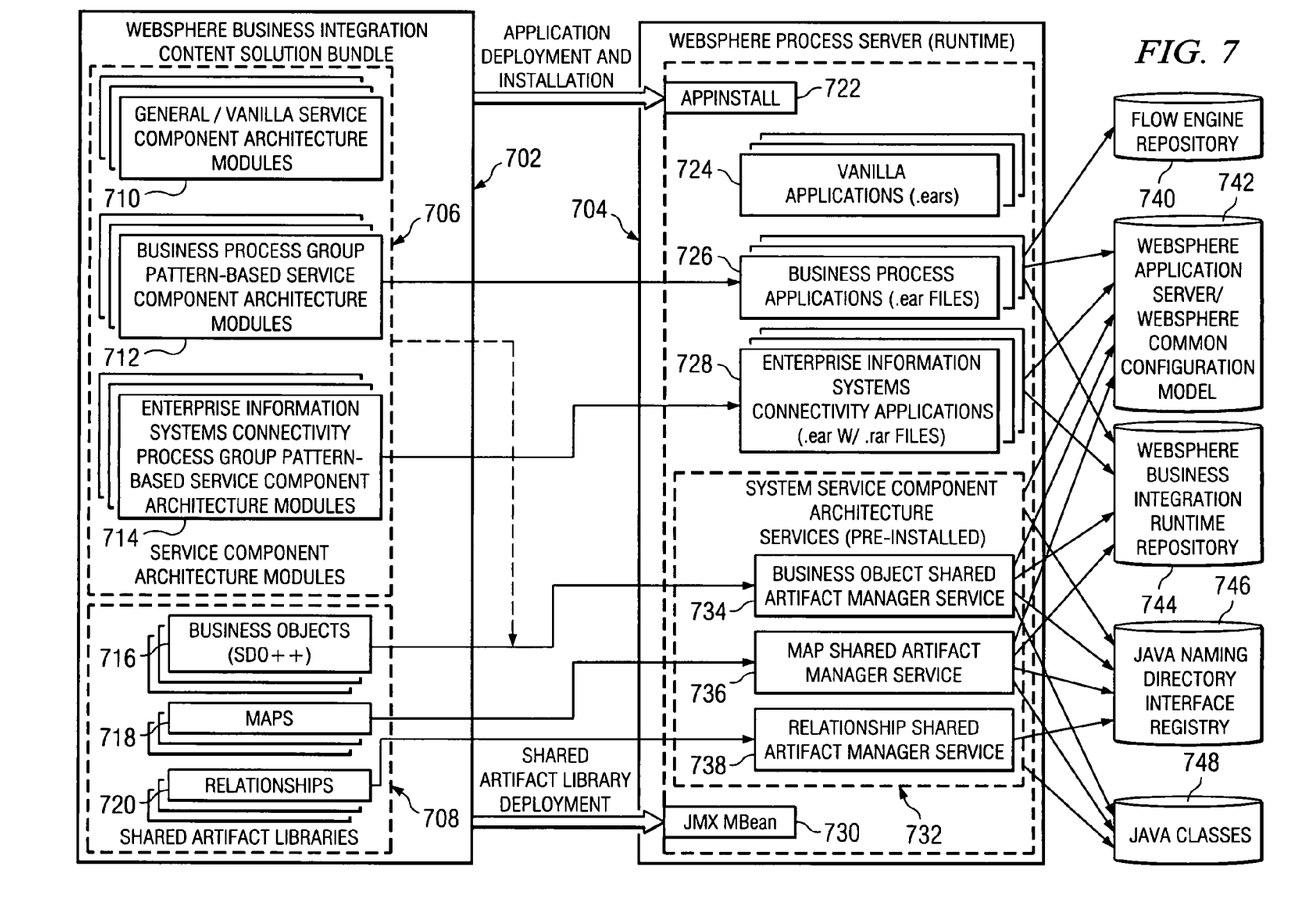
FIG. 7 is a block diagram of a server architecture depicted in accordance with an illustrative embodiment of the present invention.

FIG. 7 is a block diagram of a server architecture depicted in accordance with an illustrative embodiment of the present invention. FIG. 7 shows the relationship of the authoring and deployment tools, such as WebSphere business integration content solution bundle 702 and the runtime process server, WebSphere process server 704. WebSphere business integration content solution bundle 702 includes service component architecture modules 706 and shared artifact libraries 708. Different types of shared artifact libraries may be accessed initially on Websphere process server 704 initiating a session and session bound version set that may be long-lived.

Service component architecture modules 706 may include general modules 710, business process service component architecture modules 712, and enterprise information systems service architecture modules 714. Shared artifact libraries 708 may include business objects 716, maps 718, and relationships 720 each of which may be stored in a shared artifact library directory, such as artifact directories 410 of FIG. 4.

WebSphere business integration content solution bundle 702 is deployed and installed on WebSphere process server 704 by application install 722. WebSphere process server 704 may include a number of enterprise archive (EAR) files, such as vanilla applications 724, business process applications 726, and enterprise information systems connectivity applications 728 that are deployed and installed from service component architecture modules 706.

Shared artifact libraries 708 may be deployed in Java Management Extensions MBean 730 and integrated into system service component architecture services 732. Java Management Extensions (JMX) is a Java technology that supplies tools for managing and monitoring applications, system objects, devices, and service-oriented networks. System service component architecture services 732 may include various shared artifact managers, such as shared artifact managers 512 of FIG. 5, including business object shared artifact manager service 734, map shared artifact manager service 736, and relationship shared artifact manager service 738.

WebSphere process server 704 may store or send information from various modules to flow engine repository 740, WebSphere application server (WAS) and/or WebSphere Common Configuration Model 742, WebSphere business integration runtime repository 744, Java naming and directory interface registry 746, and Java Classes 748.

Figure 8:
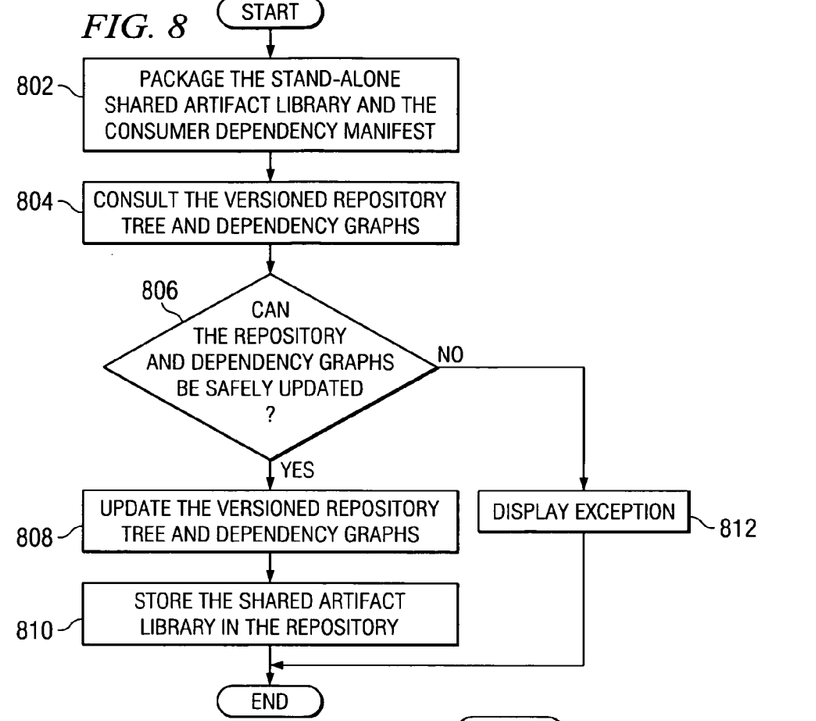
FIG. 8 is a flowchart illustrating a stand-alone deployment depicted in accordance with an illustrative embodiment of the present invention.

FIG. 8 is a flowchart illustrating a stand-alone deployment depicted in accordance with an illustrative embodiment of the present invention. The stand-alone scenario is for deploying a shared artifact library from a shared artifact library project when there are not any enterprise application consumers. In the stand-alone deployment, the payload shared artifact library Jar file may be a Jar file such as Canonical_Sal.jar 402 of FIG. 4.

The process of FIG. 8 may be implemented between shared artifact components such as shared artifact library deployment framework 502, dynamic shared artifact library loader 506, repository storage layer 508, and schema repository 510 of FIG. 5. The process begins upon deployment as the stand-alone shared artifact library and the consumer dependency manifest are packaged (step 802). A dynamic artifact loader, such as dynamic shared artifact library loader 506 of FIG. 5, may be used to consult the versioned repository tree and dependency graphs (step 804).

Next, a determination is made by the dynamic artifact loader as to whether the repository and dependency graphs can be safely updated (step 806). The determination made in step 806 is based on whether the applicable consumer dependency manifest(s) exists. Additionally, in step 806, the dynamic artifact loader determines that the deployed shared artifact library or libraries with the versions specified in the consumer dependency manifest can be added safely because of a new shared artifact library name, if there are existing consumer applications, or updated safely because a new shared artifact library version number exists, if there are no consumer applications.

If the repository and dependency graphs can be safely updated in step 806, the versioned repository tree and dependency graphs are updated (step 808). Step 808 may include deleting an existing shared artifact library as part of the update because there are no consumer applications. Updating the repository trees and dependency graphs reflect the inter-shared artifact library dependencies from the consumer dependency manifest. The dynamic artifact loader then stores the shared artifact library into the repository (step 810) with the process terminating thereafter.

Turning back to step 806, if the repository and dependency graphs cannot be safely updated, an exception is displayed (step 812) with the process terminating thereafter. The exceptions displayed in step 812 may be those sessions that are still dependent on the shared artifact libraries being analyzed. The displayed exceptions indicate the deployment process failed.

Figure 9:
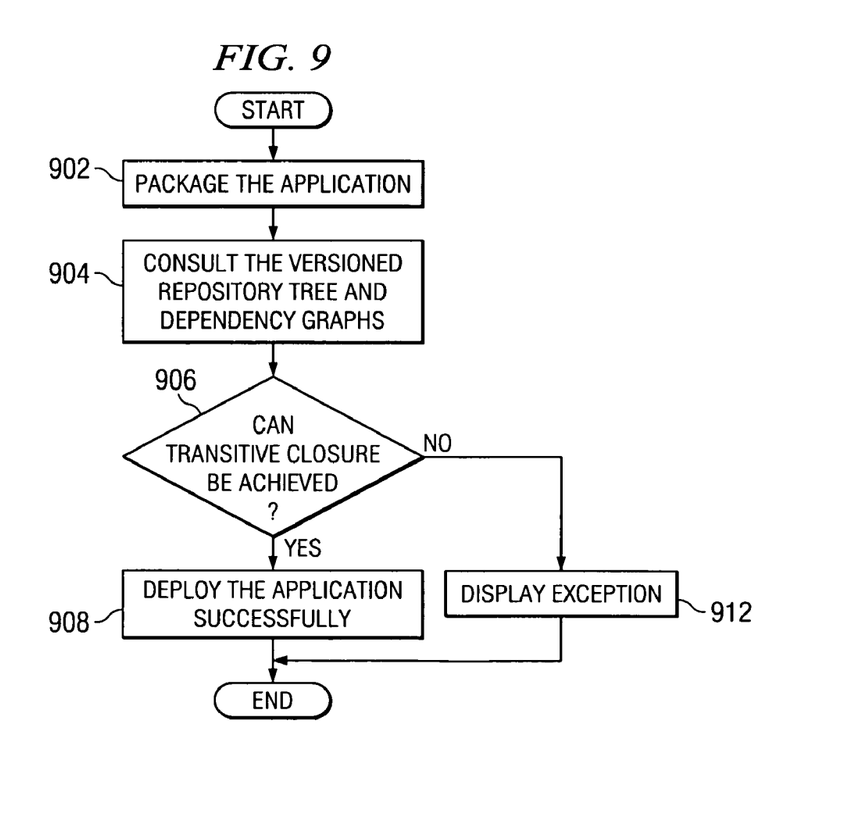
FIG. 9 is a flowchart illustrating a shallow deployment depicted in accordance with an illustrative embodiment of the present invention.

FIG. 9 is a flowchart illustrating a shallow deployment depicted in accordance with an illustrative embodiment of the present invention. Shallow deployment is the verification of one or more shared artifact libraries triggered by the deployment of a consumer application or another shared artifact library using the consumer dependency manifest entries for resolving artifacts whose existence needs to be verified. In the shallow deployment, the payload shared artifact library Jar file may include a consumer dependency manifest with entries for multiple shared artifact libraries, each of which describes the dependencies of the composite application and the libraries themselves.

The process of FIG. 9 may be implemented between shared artifact components such as shared artifact library deployment framework 502, dynamic shared artifact library loader 506, repository storage layer 508, and schema repository 510 of FIG. 5. The process begins upon deployment as the application is packaged (step 902). In step 902, the consumer application or the shared artifact library and the consumer dependency manifest may be packaged. A dynamic artifact loader, such as dynamic shared artifact library loader 506 of FIG. 5, may be used to consult the versioned repository tree and dependency graphs (step 904).

Next, a determination is made by the dynamic artifact loader if transitive closure can be achieved (step 906). Transitive closure in step 906 occurs if a session with specified dependencies has been verified as closed. If transitive closure has been achieved in step 906, the application is successfully deployed (step 908) with the process terminating thereafter. When the application is successfully deployed (step 908), the dependency graph is updated and all artifacts are successfully verified.

Turning back to step 906, if transitive closure has not been achieved, an exception is displayed (step 912) with the process terminating thereafter.

Figure 10:
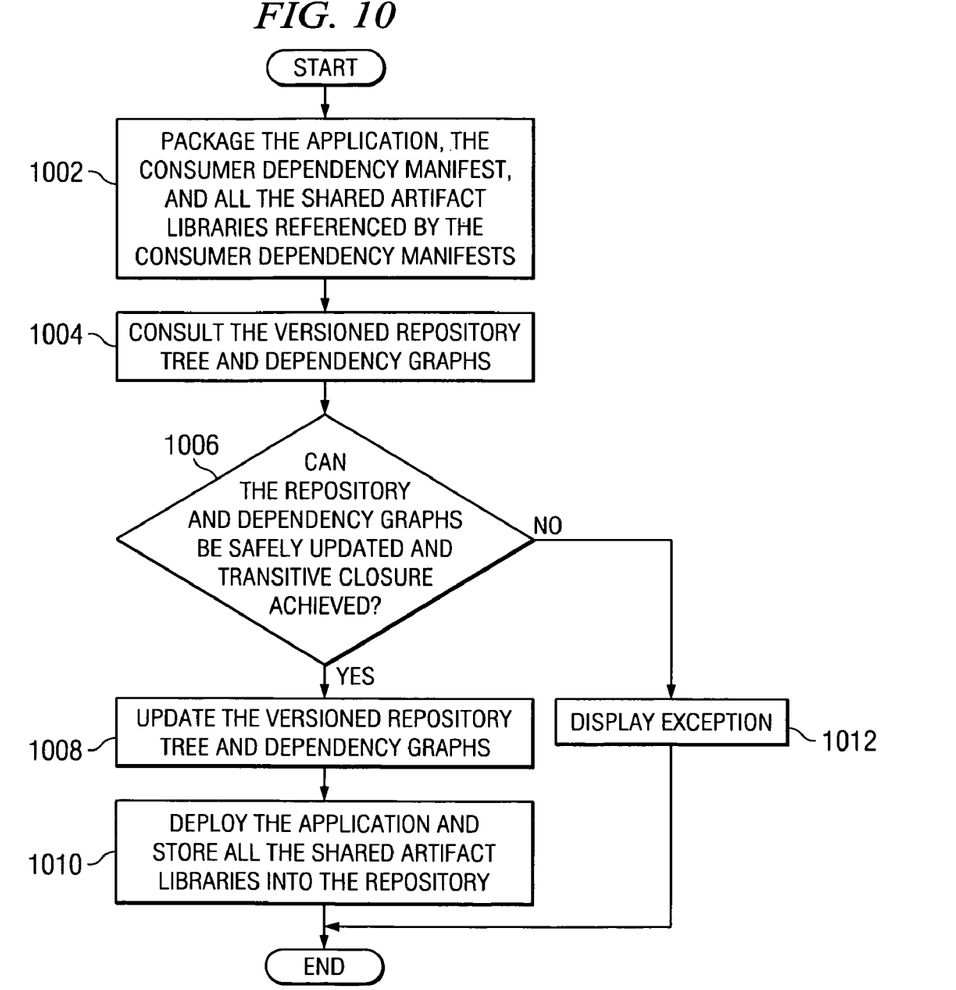
FIG. 10 is a flowchart illustrating a deep deployment depicted in accordance with an illustrative embodiment of the present invention.

FIG. 10 is a flowchart illustrating a deep deployment depicted in accordance with an illustrative embodiment of the present invention. Deep deployment is the full fledge packaging and deployment of shared artifact libraries triggered by the deployment of a consumer application or another shared artifact library using consumer dependency manifest entries for resolving shared artifact libraries. In the deep deployment scenario, the shared artifact library Jar file may include a manifest file that describes the name and version of the shared artifact library, a consumer dependency manifest with entries for multiple shared artifact libraries each of which describes the dependencies of the composite application and the libraries themselves, and the actual artifacts within the various directories of the shared artifact file.

The process of FIG. 10 may be implemented between shared artifact components such as shared artifact library deployment framework 502, dynamic shared artifact library loader 506, repository storage layer 508, and schema repository 510 of FIG. 5. The process begins upon deployment as the application, the consumer dependency manifest, and all of the shared artifact libraries referenced by the consumer dependency manifest are packaged (step 1002). A dynamic artifact loader, such as dynamic shared artifact library loader 506 of FIG. 5, may be used to consult the versioned repository tree and dependency graphs (step 1004).

Next, a determination is made by the dynamic artifact loader as to whether the repository and dependency graphs can be safely updated and transitive closure achieved (step 1006). The determination made in step 1006 is based on whether the applicable consumer dependency manifest(s) exists. Additionally, in step 1006, the dynamic artifact loader determines that the deployed shared artifact library or libraries with the versions specified in the consumer dependency manifest can be added safely because of a new shared artifact library name, if there are existing consumers, or updated safely because a new shared artifact library version number exists, if there are no consumers.

If the repository and dependency graphs can be safely updated in step 1006, the versioned repository tree and dependency graphs are updated (step 1008). Step 1008 may include deleting an existing shared artifact library as part of the update because there are no consumers. Updating the repository trees and dependency graphs reflect the inter-shared artifact library dependencies from the consumer dependency manifest. The dynamic artifact loader then deploys the application and stores the shared artifact libraries into the repository (step 1010) with the process terminating thereafter.

Turning back to step 1006, if the repository and dependency graphs cannot be safely updated and transitive closure achieved, an exception is displayed (step 1012) with the process terminating thereafter. The exceptions displayed in step 1012 may be those sessions that are still dependent on the shared artifact libraries being analyzed.

Figure 11:
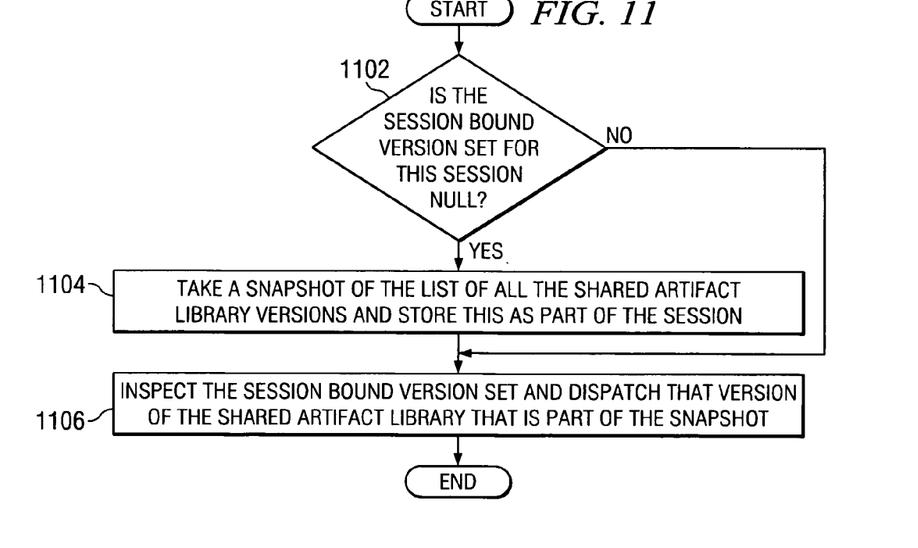
FIG. 11 is a flowchart illustrating a dynamic shared artifact loader resolving a request for a stand-alone library at runtime and binding of a version to a session depicted in accordance with an illustrative embodiment of the present invention.

FIG. 11 is a flowchart illustrating a dynamic shared artifact loader resolving a request for a stand-alone library at runtime and binding of a version to a session depicted in accordance with an illustrative embodiment of the present invention.

At runtime, each shared artifact manager may resolve a request for an artifact through the dynamic artifact loader. The loader implementation selects the correct version shared artifact library from which to load the artifact based on the consumer dependent manifest captured during the active session. A file within the data structure of the potentially long-lived active session may be used to store a session bound version set (SBVS). The session bound version set is a snapshot of shared artifact libraries that match the acceptability version-ranges specified in the consumer dependency manifest of the calling consumer application which is requested for a given artifact. The data structure of the active session may be identified by a globally unique session identification.

The process illustrated in FIG. 11 may be implemented in a dynamic artifact loader, such as dynamic shared artifact library loader 506 of FIG. 5. The process begins by determining whether the session bound version set is null (step 1102). If the determination is that the session bound version set is null in step 1102, the session is brand new. If the session bound version set is not null in step 1102, the session is potentially a long-lived session which may indicate that a subsequent request may be made for an artifact within the same session.

If the session bound version set is null in step 1102, the dynamic artifact loader takes a snapshot of the list of all the shared artifact library versions and stores the libraries as part of the session (step 1104). The list of all shared artifact libraries copied and saved in step 1104 qualifies because of their consumer dependency manifests. The dynamic artifact loader next inspects the session bound version set and dispatches the version of the shared artifact library that is part of the snapshot (step 1106) with the process terminating thereafter. The shared artifact library version will be specified as part of the session bound version set for a specified session so that all subsequent requests for artifacts within the specified session will be dispensed from the same session-bound versions of the shared artifact libraries recorded in the session bound version set.

Turning back to step 1102, if the session bound version set for the session is not null, the dynamic artifact loader inspects the session bound version set and dispatches the version of the shared artifact library that is part of the snapshot (step 1106) with the process terminating thereafter. As a result of the process of FIG. 11, even if a newer version of a shared artifact library is deployed into the system, only newer session bound version sets are linked to the newest shared artifact library.

Figure 12:
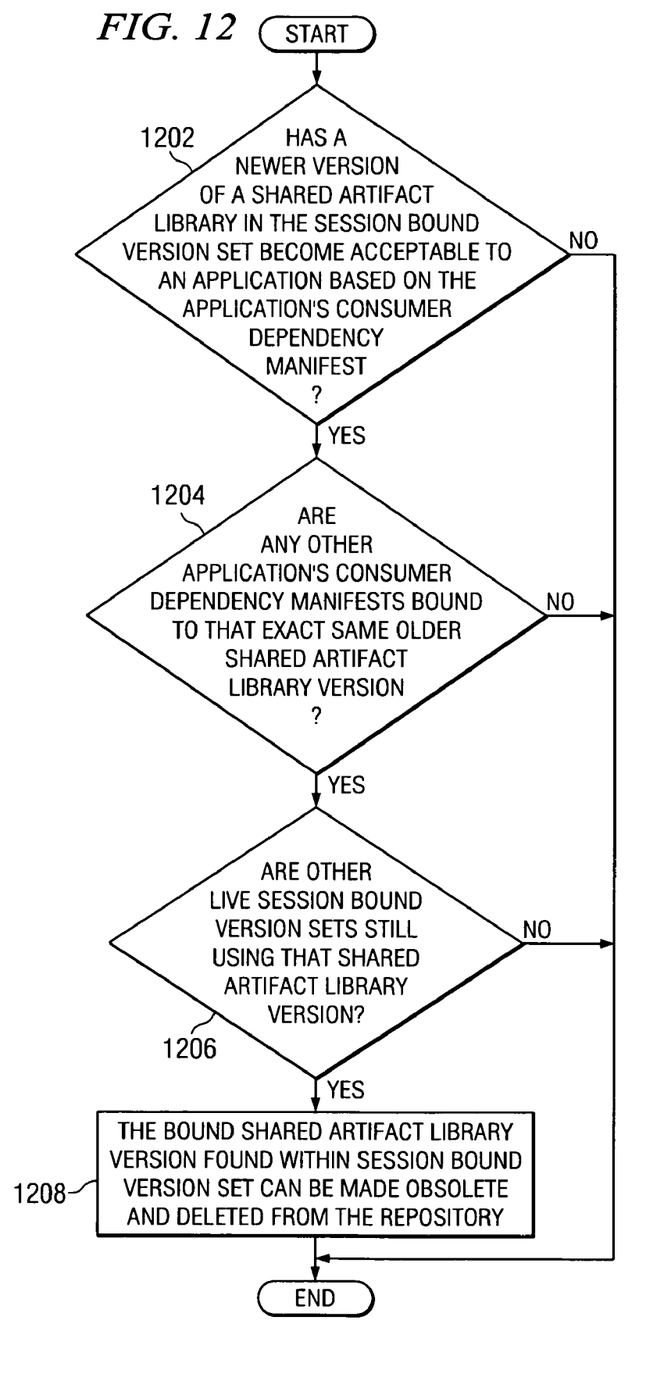
FIG. 12 is a flowchart illustrating a draining of obsolete stand-alone library versions at the end of a session depicted in accordance with an illustrative embodiment of the present invention.

FIG. 12 is a flowchart illustrating a draining of obsolete stand-alone library versions at the end of a session depicted in accordance with an illustrative embodiment of the present invention.

When a session is completed, the dynamic artifact loader would be notified and any bound shared artifact library in a particular session bound version set is checked for obsolescence. The process illustrated in FIG. 12 may be implemented in a dynamic artifact loader, such as dynamic shared artifact library loader 506 of FIG. 5. The process begins when the dynamic artifact library determines whether a newer version of a shared artifact library has become acceptable to an application based on the application's consumer dependency manifest (step 1202). If the determination in step 1202 is no, the process terminates because the updated version of the shared artifact library is not acceptable to the application and therefore the shared artifact library cannot be deleted because the library is still needed.

If the determination in step 1202 is yes, the dynamic artifact loader determines if any other applications consumer dependency manifests are bound to the exact same older shared artifact library version (step 1204). If the determination in step 1204 is no, the process terminates because other applications still rely on the older version of the shared artifact library and therefore the shared artifact library cannot be deleted because the library is still needed.

If the determination in step 1204 is yes, the dynamic artifact loader determines if other live session bound version sets are still using the specified shared artifact library version (step 1206). If the determination in step 1206 is no, the process terminates because the older shared artifact library is needed.

If the determination in step 1206 is yes, the bound shared artifact library version found within the session bound version set is made obsolete and deleted from the repository (step 1208). Step 1208 allows new session bound version sets to be saved and conserves resources. In another illustrative embodiment, a user may archive shared artifact libraries for a specified time period, allow for manual deletion, or create a permanent archive.

Thus, aspects of the present invention allow shared artifact libraries to be updated as needed without necessary downtime to update a system. As the consuming application begins a new session that may be long-lived, a snapshot is taken of libraries upon which the consuming application depends. At any time while the session is still active, the consuming application can refer to the time accurate snapshot of the dependent libraries and artifacts.

In the meantime, updates to the shared artifact libraries can occur so that new sessions use the updated artifacts and libraries. As a result, the most updated shared artifact libraries are continuously available to consuming applications and long-lived sessions have the necessary artifacts. Once the number of active sessions for a given version of a shared artifact library becomes zero and a more recent version of the shared artifact library has become available and acceptable to all consuming applications, the older version of the shared artifact library may be deemed obsolete and drained or removed from the system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of updating multiple concurrent versions of shared artifact libraries, the computer implemented method comprising:

associating, by a processor, a set of shared artifact libraries with a consuming application for establishing shared artifact libraries upon which the consuming application has a dependency for artifacts; and wherein the consuming application includes a service module for processing service requests directed to the consuming application;

responsive to receiving a service request directed to the consuming application, starting, by the processor, a session instance of the consuming application for processing the service request and creating, by the processor, a snapshot of the set of shared artifact libraries associated with the consuming application in an active session;

updating, by the processor, the set of shared artifact libraries in response to changes to the set of shared artifact libraries becoming available; and dispensing, by the processor, artifacts from the set of shared artifact libraries to the consuming application based on the snapshot of the session.

2. The computer implemented method of claim 1 further comprising:
automatically deleting the snapshot and the set of shared artifact libraries when the dependency on the snapshot is removed.

3. The computer implemented method of claim 1, wherein the associating step further comprises:
declaring the dependency between the consuming application and the set of shared artifact libraries using a manifest.

4. The computer implemented method of claim 3, wherein declaring the dependency further comprises:
declaring the dependency between libraries within the set of shared artifact libraries using a consumer dependency manifest.

5. The computer implemented method of claim 1, wherein the dependency describes at least one of a shared artifact library version, a shared artifact library name, an acceptable version range, a dependency list.

6. The computer implemented method of claim 1, wherein the dependency on the snapshot is automatically removed when active sessions no longer depend on the snapshot and a more updated version of the set of shared artifact libraries is available and acceptable.

7. The computer implemented method of claim 1, wherein the snapshot is a copy of the set of shared artifact libraries in the active session upon which the consuming application is dependent.

8. The computer implemented method of claim 7, further comprising:
storing the snapshot in a repository.

9. The computer implemented method of claim 8, wherein the storing step comprises storing a pointer to the snapshot.

10. The computer implemented method of claim 9, wherein the set of shared artifact libraries included in a plurality of snapshots are saved only once for conserving memory with each of the plurality of snapshots linked to the set of shared artifact libraries included in each of the plurality of snapshots respectively.

11. The computer implemented method of claim 1, wherein a shared artifact library within the set of shared artifact libraries is stored in a Jar file, wherein the Jar file includes a manifest file describing the name and version of the shared artifact library.

12. The computer implemented method of claim 11, wherein the Jar file includes a consumer dependency manifest that describes the acceptable version range of the shared artifact library and dependencies of the shared artifact library upon other shared artifact libraries.

13. The computer implemented method of claim 1, further comprising:
analyzing a plurality of snapshots for determining whether the set of shared artifact libraries has already been stored, wherein if a specific shared artifact library within the set of shared artifact libraries has been previously stored, the previously stored shared artifact library is referenced by the snapshot for avoiding data redundancy.

14. The computer implemented method of claim 1, further comprising:
storing the set of shared artifact libraries in a repository.

15. The computer implemented method of claim 1, wherein the dispensing step further comprises:
packaging a payload; and
deploying a payload to a shared artifact framework;
wherein the shared artifact framework includes an artifact loader, a set of artifact managers, a repository storage layer, and a repository;
wherein the set of artifact managers includes one or more of a business object artifact manager, a maps artifact manager, a relationships artifact manager, and may include other artifact managers; and
wherein the shared artifact framework is configured to perform load, store, and update operations for artifacts included in the payload.

16. The computer implemented method of claim 1, wherein the payload is a shared artifact library file including a manifest that describes a name and version of a shared artifact library, a consumer dependency manifest, and artifacts.

17. The computer implemented method of claim 1, wherein the dispensing step is responsive to a determination that a dependency graph and a repository tree can be safely updated.

18. The computer implemented method of claim 1, wherein the dispensing step is responsive to the transitive closure of all active session dependencies within the consumer dependency manifest.

19. A system comprising:
a processor for running a consuming application; and
a storage operably connected to the processor for storing the consuming application, a set of artifact libraries and a consumer dependency manifest associated with the set of shared artifact libraries, and a shared artifact framework, wherein the consuming application is loaded into a main memory for execution by the processor, wherein the shared artifact framework binds the set of shared artifact libraries that the consuming application is dependent on in an active session that is started when the consuming application is opened, and takes a snapshot of the set of shared artifact libraries bound to the active session that is stored in the storage as part of the snapshot, wherein the storage is updated with a new set of shared artifact libraries in response to changes to the set of shared artifact libraries, and wherein the consuming application continues to reference the set of shared artifact libraries referenced in the snapshot.

20. The system of claim 19, wherein the set of shared artifact libraries bound to the active session is automatically deleted when the active sessions no longer depend on the snapshot and a more updated version of the set of shared artifact libraries is available and acceptable.

21. A computer program product comprising:
a computer readable storage medium having computer usable program code tangibly embodied thereon for updating multiple concurrent versions of shared artifact libraries, the computer program product including:
computer usable program code for associating a set of shared artifact libraries with a consuming application for establishing shared artifact libraries upon which the consuming application has a dependency for artifacts, and wherein the consuming application includes a service module for processing service requests directed to the consuming application;
computer usable program code for responsive to receiving a service request directed to the consuming application, starting a session instance of the consuming application for processing the service request and taking a snapshot of the set of shared artifact libraries associated with the consuming application in an active session;

computer usable program code for updating the set of shared artifact libraries in response to changes to the set of shared artifact libraries becoming available; and computer usable program code for dispensing artifacts from the set of shared artifact libraries to the consuming application based on the snapshot of the session.

22. The computer program product of claim 21, further including:

computer usable program code for automatically deleting the snapshot and the set of shared artifact libraries when the dependency on the snapshot is removed.

23. The computer program product of claim 21, wherein the computer usable program code for associating further comprises:

computer usable program code for declaring the dependency between the consuming application and the set of shared artifact libraries using a manifest file.

24. The computer program product of claim 21, wherein the computer usable program code for declaring the dependency further comprises:

computer usable program code for declaring the dependency between libraries within the set of shared artifact libraries using a consumer dependency manifest.

25. The computer program product of claim 21, further including:

computer usable program code for storing the set of shared artifact libraries in a repository.

26. The computer program product of claim 21, wherein the dispensing step further comprises:

computer usable program code for packaging a payload; and computer usable program code for deploying a payload to a shared artifact framework:

wherein the shared artifact framework includes an artifact loader, a set of artifact managers, a repository storage layer, and a repository;

wherein the set of artifact managers includes one or more of a business object artifact manager, a maps artifact manager, a relationships artifact manager, and may include other artifact managers; and wherein the shared artifact framework is configured to perform load, store, and update operations for artifacts included in the payload.

27. The computer program product of claim 21, wherein the payload is a shared artifact library file including a manifest that describes a name and version of a shared artifact library, a consumer dependency manifest, and artifacts.

28. The computer program product of claim 21, wherein the change comprise at least one new versions of the set of shared artifact libraries and updates to the set of shared artifact libraries.

* * * * *